(12) United States Patent
Wang et al.

(10) Patent No.: US 10,908,700 B2
(45) Date of Patent: Feb. 2, 2021

(54) ELECTRONIC HANDWRITING APPARATUS AND ELECTRONIC HANDWRITING DISPLAY SYSTEM

(71) Applicant: Beijing Dianshijingwei Technology Co., Ltd., Beijing (CN)

(72) Inventors: Zengfeng Wang, Beijing (CN); Yunhai Jia, Beijing (CN)

(73) Assignee: BEIJING DIANSHIJINGWEI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/493,594

(22) PCT Filed: Mar. 15, 2018

(86) PCT No.: PCT/CN2018/079164
§ 371 (c)(1),
(2) Date: Sep. 12, 2019

(87) PCT Pub. No.: WO2018/166500
PCT Pub. Date: Sep. 20, 2018

(65) Prior Publication Data
US 2020/0089329 A1  Mar. 19, 2020

(30) Foreign Application Priority Data

Mar. 15, 2017 (CN) .......................... 2017 1 0153856

(51) Int. Cl.
*G06F 3/023* (2006.01)
*G09G 5/04* (2006.01)
(52) U.S. Cl.
CPC .............. *G06F 3/023* (2013.01); *G09G 5/04* (2013.01); *G09G 2354/00* (2013.01)

(58) Field of Classification Search
CPC .................................. G06F 3/023; G09G 5/94
(Continued)

(56) References Cited

U.S. PATENT DOCUMENTS 5,028,958 A * 7/1991 Onishi ................... G03G 15/01
399/184
9,310,998 B2 * 4/2016 Demiya .............. G06F 3/04883
(Continued)

FOREIGN PATENT DOCUMENTS

CN       1477489       *  2/2004    .......... G06F 3/0354
CN       1477489 A       2/2004
(Continued)

OTHER PUBLICATIONS

CN1477489_specification, Feb. 2004, China, Zhou, Xianzhong.*

*Primary Examiner* — Prabodh M Dharia
(74) *Attorney, Agent, or Firm* — Muncy, Geissler, Olds & Lowe, P.C.

(57) ABSTRACT

The invention discloses an electronic handwriting apparatus and a handwriting display system of the electronic handwriting apparatus. The electronic handwriting apparatus is electrically connected to an electronic display apparatus, and comprises: at least one color setting button, each outputting a color setting signal; a first control unit electrically connected to each of the color setting buttons, receiving an output color setting signal and outputting a color selection signal according to the output color setting signal; the electronic display apparatus storing a plurality of color display information, selecting, according to the color selection signal, color display information corresponding to the color selection signal from the plurality of color display information, and setting the display information as current handwriting color when the handwriting apparatus performs handwriting input on the display apparatus.

8 Claims, 3 Drawing Sheets

(58) Field of Classification Search
USPC .................. 345/156; 715/268, 841; 713/182; 380/201
See application file for complete search history.

(56) References Cited

U.S. PATENT DOCUMENTS

| | | | |
|---|---|---|---|
| 10,528,153 B2 * | 1/2020 | Croisonnier | G06F 3/0219 |
| 2007/0053513 A1 * | 3/2007 | Hoffberg | G06K 9/00369 |
| | | | 380/201 |
| 2007/0091070 A1 * | 4/2007 | C. Larsen | G06F 3/0213 |
| | | | 345/168 |
| 2008/0126977 A1 * | 5/2008 | Keohane | G06F 3/04895 |
| | | | 715/773 |
| 2011/0185184 A1 * | 7/2011 | Guenther | G06F 21/32 |
| | | | 713/182 |
| 2013/0212535 A1 * | 8/2013 | Kim | G06F 3/04886 |
| | | | 715/841 |
| 2014/0380253 A1 * | 12/2014 | Shoji | G06F 3/04842 |
| | | | 715/863 |
| 2016/0147436 A1 * | 5/2016 | Tsutsui | G06F 3/018 |
| | | | 715/268 |
| 2016/0239247 A1 * | 8/2016 | Hibino | G06F 3/1205 |
| 2017/0090692 A1 * | 3/2017 | Kurita | G06F 3/04883 |
| 2019/0294242 A1 * | 9/2019 | Amstutz | A41D 19/0024 |

FOREIGN PATENT DOCUMENTS

| | | |
|---|---|---|
| CN | 205318346 U | 6/2016 |
| CN | 206696833 U | 12/2017 |
| TW | 201535167 A | 9/2015 |

* cited by examiner

ELECTRONIC HANDWRITING APPARATUS AND ELECTRONIC HANDWRITING DISPLAY SYSTEM

BACKGROUND OF THE INVENTION

1. Field of the Invention

The invention relates to an electronic handwriting apparatus and an electronic handwriting display system.

2. Related Art

With development of various portable electronic devices, in order to make the user's operations more convenient, various types of electronic handwriting apparatuses are developed. However, in use of the existing electronic handwriting apparatus, if the user needs to change handwriting color during handwriting input, the change of the handwriting color during handwriting input needs to be performed by tap operations of the electronic handwriting apparatus on a color palette displayed on a display screen of the electronic apparatus, so that it is quite inconvenient for the user. Therefore, it is urgent to develop an electronic handwriting apparatus that overcomes the above deficiency.

SUMMARY OF THE INVENTION

The technical problem to be solved by the invention is to provide an electronic handwriting apparatus electrically connected to an electronic display apparatus, and comprising:

at least one color setting button, each outputting a color setting signal;

a first control unit electrically connected to each of the color setting buttons, receiving an output color setting signal and outputting a color selection signal according to the output color setting signal; the electronic display apparatus storing a plurality of color display information, and selecting, according to the color selection signal, color display information corresponding to the color selection signal from the plurality of color display information, and setting the color display information as current handwriting color when the electronic handwriting apparatus performs handwriting input on the electronic display apparatus.

Regarding the above electronic handwriting apparatus, it further comprises a first communication unit electrically connected to the first control unit and the electronic display apparatus, and transmitting signals between the first control unit and the electronic display apparatus.

Regarding the above electronic handwriting apparatus, it further comprises a first storage unit electrically connected to the first control unit, and storing a plurality of color selection signals, and the first control unit, according to the color setting signal, selecting the color selection signal corresponding to the color setting signal from the plurality of color selection signals, and outputting the color selection signal to the electronic display apparatus through the first communication unit.

Regarding the above electronic handwriting apparatus, the electronic display apparatus comprises:

a second storage unit storing the plurality of color display information;

a second control unit electrically connected to the second storage unit, selecting and outputting, according to the color selection signal, the color display information corresponding to the color selection signal from the plurality of color display information;

a display unit electrically connected to the second control unit, receiving and displaying the color display information; and a second communication unit electrically connected to the second control unit and the first communication unit, and transmitting signals between the second control unit and the first communication unit.

Regarding the above electronic handwriting apparatus, it further comprises a pressure sensing unit electrically connected to the at least one color setting button and the first control unit, and outputting the output color setting signal to the first control unit by pressing one of the at least one color setting button.

The invention further provides an electronic handwriting display system, comprising:

an electronic handwriting apparatus, comprising:

at least one color setting button, each outputting a color setting signal;

a first control unit electrically connected to each of the color setting buttons, receiving an output color setting signal and outputting a color selection signal according to the output color setting signal;

an electronic display apparatus electrically connected to the first control unit, storing a plurality of color display information, selecting, according to the color selection signal, color display information corresponding to the color selection signal from the plurality of color display information, and setting the color display information as current handwriting color when the electronic handwriting apparatus performs handwriting input on the electronic display apparatus.

Regarding the above electronic handwriting display system, the electronic handwriting apparatus further comprises a first communication unit electrically connected to the first control unit and the electronic display apparatus, and transmitting signals between the first control unit and the electronic display apparatus.

Regarding the above electronic handwriting display system, the electronic handwriting apparatus further comprises a first storage unit electrically connected to the first control unit, and storing the plurality of color selection signals, and the first control unit, according to the color setting signal, selecting the color selection signal corresponding to the color setting signal from the plurality of color selection signals, and outputting the color selection signal to the electronic display apparatus via the first communication unit.

Regarding the above electronic handwriting display system, the electronic display apparatus comprises:

a second storage unit storing the plurality of color display information;

a second control unit electrically connected to the second storage unit, selecting and outputting, according to the color selection signal, the color display information corresponding to the color selection signal from the plurality of color display information;

a display unit electrically connected to the second control unit, receiving and displaying the color display information; and a second communication unit electrically connected to the second control unit and the first communication unit, and transmitting signals between the second control unit and the first communication unit.

Regarding the above electronic handwriting display system, it further comprises a pressure sensing unit electrically connected to the at least one color setting button and the first control unit, and outputting the output color setting signal to the first control unit by pressing one of the at least one color setting button.

With respect to the prior art, effects of the invention are that the electronic handwriting apparatus outputs color selection signals according to output color setting signals output from the color setting buttons, and the electronic display apparatus sets, according to the color selection signals, current handwriting color when the electronic handwriting apparatus performs handwriting input on the electronic display apparatus, so that it is unnecessary for the user to tap the electronic display apparatus through the electronic handwriting apparatus to change input color, which enhances controllability of the electronic handwriting apparatus, makes the user's operations more convenient, and brings better operation experience to the user.

PREFERABLE EMBODIMENTS OF THE INVENTION

Now detailed contents and technical descriptions of the invention are further explained using a preferable embodiment, but it shall not be explained as limitation to implementation of the invention. The electronic display apparatus is a mobile phone, a tablet computer, a personal digital processor, and the like having display, communication and signal processing functions.

Figure 1:
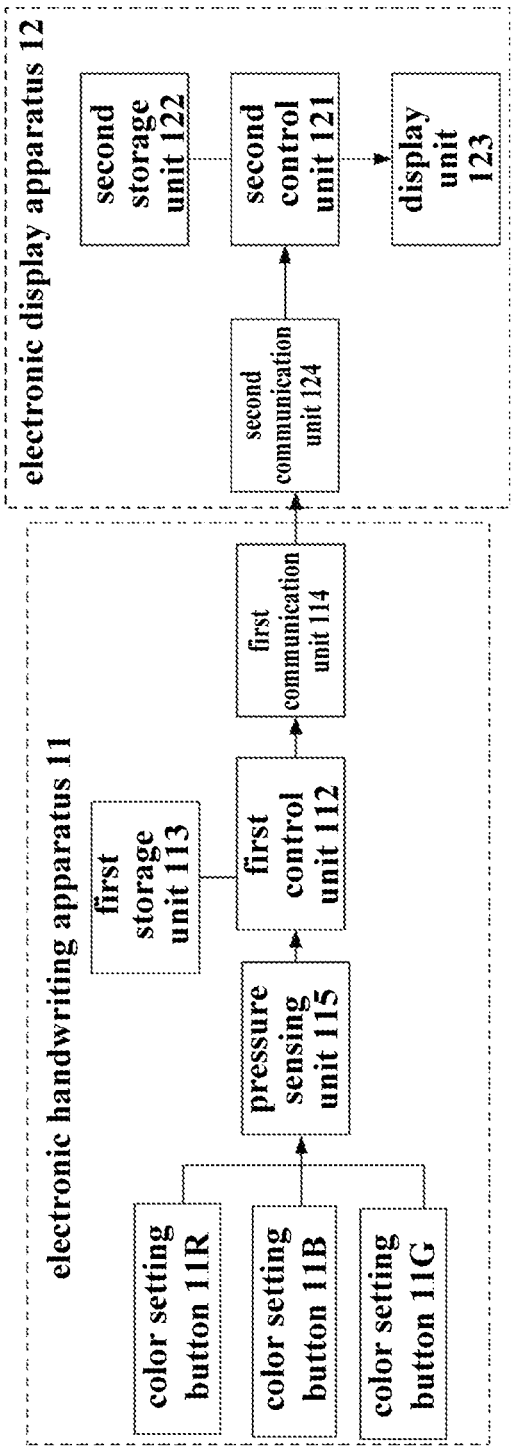
FIG. 1 is a structural diagram of an electronic handwriting apparatus according to the invention.

Please refer to FIG. 1, which is a structural diagram of an electronic handwriting apparatus according to the invention. As shown in FIG. 1, the electronic handwriting apparatus of the invention comprises color setting buttons 11R, 11B, 11G, a first control unit 112, a first storage unit 113 and a first communication unit 114, the color setting buttons 11R, 11B, 11G output color setting signals, wherein this embodiment comprises three color setting buttons, but the invention is not limited thereto; the first control unit 112 is electrically connected to the color setting buttons 11R, 11B, 11G; the first storage unit 113 is electrically connected to the first control unit 112, and stores a plurality of color selection signals; the first communication unit 114 is electrically connected to the first control unit 112 and an electronic display apparatus 12, and transmits signals between the first control unit 112 and the electronic display apparatus 12. The first control unit 112 receives the color setting signal output from one of the color setting buttons 11R, 11B, 11G, selects a color selection signal corresponding to the color setting signal from the multiple types of color selection signals according to the color setting signal, and outputs the color selection signal to the electronic display apparatus 12 via the first communication unit 114. The electronic display apparatus 12 stores a plurality of color display information, selects, according to the color selection signal, color display information corresponding to the color selection signal from the plurality of color display information, and sets the color display information as current handwriting color when the electronic handwriting apparatus 11 performs handwriting input on the electronic display apparatus 12.

In this embodiment, it further comprises a pressure sensing unit 115 electrically connected to the color setting buttons 11R, 11B, 11G and the first control unit 112, and outputting an output color setting signal to the first control unit 112 by pressing one of the color setting buttons 11R, 11B, 11G.

It shall be noted that the first control unit 112 in this embodiment is a stylus controller, but the invention is not limited thereto.

Further, the electronic display apparatus 12 comprises a second control unit 121, a second storage unit 122, a display unit 123 and a second communication unit 124. The second storage unit 122 storing the multiple types of color display information. The second communication unit 124 electrically connected to the second control unit 121 and the first communication unit 114 and transmits signals between the second control unit 121 and the first communication unit 114. The second control unit 121 receives a color selection signal through the second communication unit 124, and selects, according to the color selection signal, color display information corresponding to the color selection signal from the plurality of color display information to be the current handwriting color when the electronic handwriting apparatus 11 performs handwriting input on the electronic display apparatus 12. The display unit 123 electrically connected to the second control unit 121, and displaying the handwriting color.

It shall be noted that in this embodiment, the first communication unit and the second communication unit are both radio frequency modules, but the invention is not limited thereto. In other embodiments, signal transmission method between the first communication unit and the second communication unit is also a wired transmission method, or other wireless transmission method.

Hereinafter working procedure of the electronic handwriting apparatus of the invention is explicitly described with reference to FIG. 1. Herein the output color setting signals output by the color setting buttons 11R, 11B, 11G are defined as red, black and green, respectively, but the invention is not limited thereto. When the user wants to adjust the current handwriting color during handwriting input to be red, the user presses the color setting button 11R, and the color setting button 11R outputs the color setting signal. The first control unit 112 receives the color setting signal, and selects, according to the color setting signal, a color selection signal corresponding to the color setting signal from the plurality of color selection signals, wherein the color selection signal is defined to be red, and the first control unit 112 outputs the color selection signal to the electronic display apparatus 12 via the first communication unit 114. The second storage unit 112 of the electronic display apparatus 12 stores a plurality of color display information, the second control unit 121 receives the color selection signals via the second communication unit 124 and selects, according to the color selection signals, color display information corresponding to the color selection signal from the plurality of color display information, wherein the color display information is defined to be red, the second control unit 121 outputs the color display information to the display unit 123, and the display unit displays the color display information, thereby setting the current handwriting color when the electronic handwriting apparatus 11 performs handwriting input on the electronic display apparatus 12 to be red.

Figure 2:
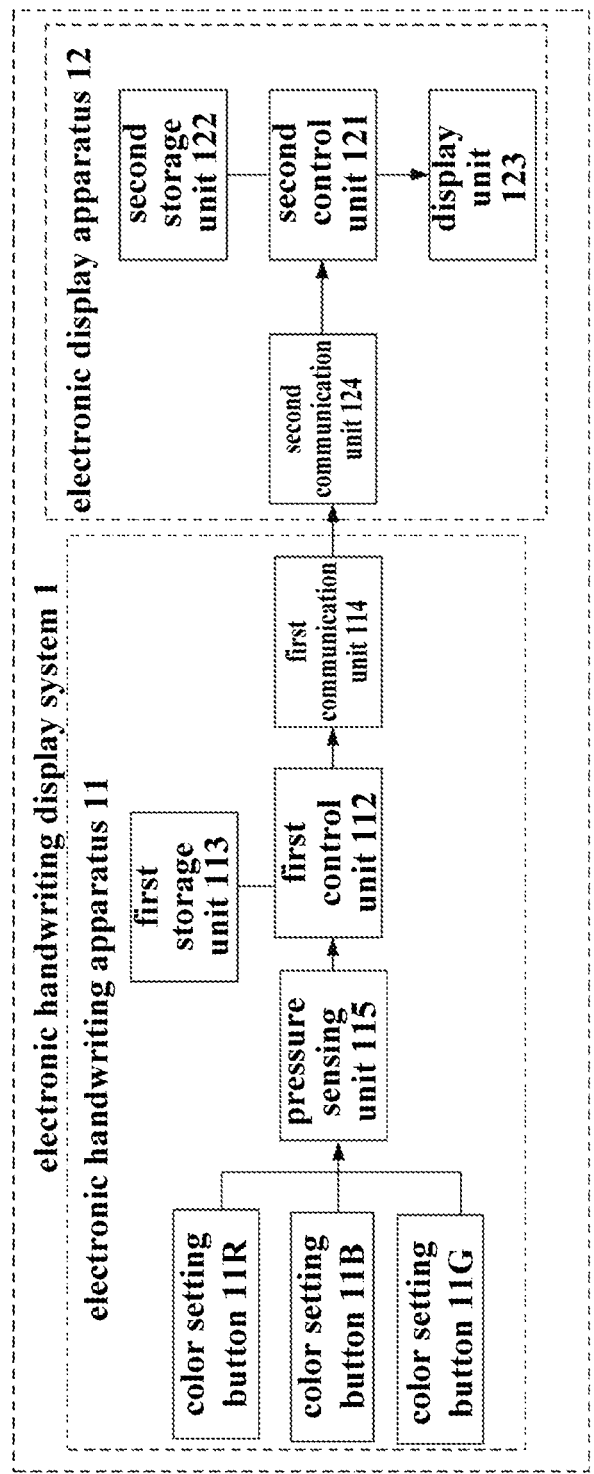
FIG. 2 is a structural diagram of an electronic handwriting display system according to one embodiment of the invention.

Then, please refer to FIG. 2, which is a structural diagram of an electronic handwriting display system according to one embodiment of the invention. The electronic handwriting display system 1 of the invention comprises: an electronic handwriting apparatus 11 and an electronic display apparatus 12 electrically connected to the electronic handwriting apparatus 11, wherein structures and functions of the electronic handwriting apparatus and the electronic display apparatus of the electronic handwriting display system 1 shown in FIG. 2 are the same as the structures, functions and working procedure of the electronic handwriting apparatus and the electronic display apparatus shown in FIG. 1. The details are omitted.

Figure 3:
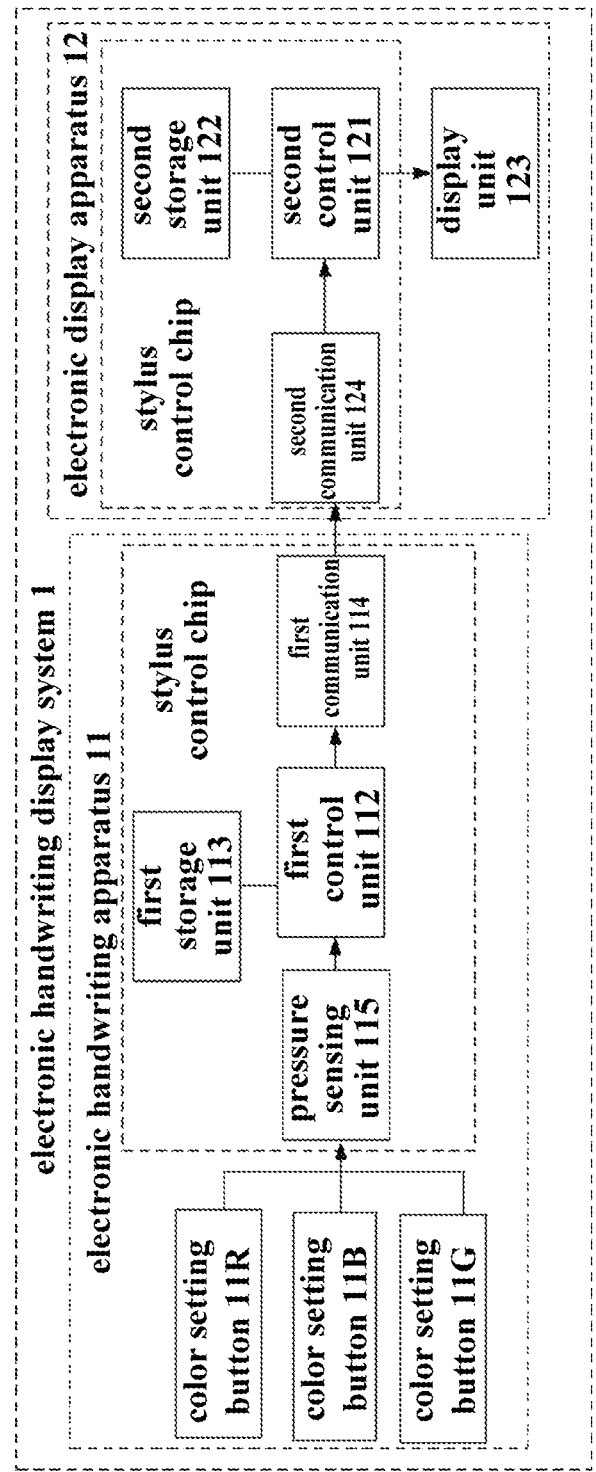
FIG. 3 is a structural diagram of the electronic handwriting display system according to another embodiment of the invention.

Please refer to FIG. 3, which is a structural diagram of the electronic handwriting display system according to another embodiment of the invention. As shown in FIG. 3, the electronic handwriting apparatus comprises a body fitted with color setting buttons 11R, 11B, 11G, and a stylus control chip disposed within the body and comprising a first control unit 112, a first storage unit 113, a first communication unit 114 and a pressure sensing unit 115. The color setting buttons 11R, 11B, 11G are electrically connected to the pressure sensing unit 115, and the pressure sensing unit 115 is electrically connected to the first control unit 112. After pressing one of the color setting buttons 11R, 11B, 11G, the pressure sensing unit 115 outputs a color setting signal to the first control unit 112. The electronic display apparatus comprises a display screen and a touch screen control chip. The display unit 123 is a display screen, and the touch screen control chip comprises the second control unit 121, the second storage unit 122 and the second communication unit 124. Specific structures and working principles of the electronic handwriting apparatus and the electronic display apparatus are the same as that of the electronic handwriting apparatus and the electronic display apparatus shown in FIGS. 1 and 2. The details are omitted.

The preferable embodiments are that the stylus control chip is GT930 Pro stylus control chip from Goodix and the touch screen control chip is GT9110P touch screen control chip from Goodix, but the invention is not limited thereto.

In conclusion, the invention outputs color selection signals by the electronic handwriting apparatus according to output color setting signals output by the color setting buttons, and sets, according to the color selection signals, current handwriting color when the electronic handwriting apparatus performs handwriting input on the electronic display apparatus by the electronic display apparatus, so that it is unnecessary for the user to tap the electronic display apparatus with the electronic handwriting apparatus to change input color, which enhances controllability of the electronic handwriting apparatus, makes the user's operations more convenient, and brings better operation experience to the user.

The above disclosures are only preferable embodiments of the invention, instead of limiting the scope of implementation of the invention. In the case of not departing from spirit and essence of the invention, those skilled in the art shall make various corresponding modifications and variations according to the invention, but these corresponding modifications and variations shall belong to the scope protected by the appended claims of the invention.

INDUSTRIAL APPLICABILITY

In conclusion, the electronic handwriting apparatus of the invention outputs color selection signals according to output color setting signals output by the color setting buttons, and the electronic display apparatus sets, according to the color selection signals, current handwriting color when the electronic handwriting apparatus performs handwriting input on the electronic display apparatus, so that it is unnecessary for the user to tap the electronic display apparatus with the electronic handwriting apparatus to change input color, which enhances controllability of the electronic handwriting apparatus, makes the user's operations more convenient, and brings better operation experience to the user.

What is claimed is:

1. An electronic handwriting apparatus electrically connected to an electronic display apparatus, and comprising:
    at least one color setting button, each outputting a color setting signal, wherein the at least one color setting button is composed of a red color setting button, a black color setting button and a green color setting button;
    a first control unit electrically connected to each of the color setting buttons, receiving an output color setting signal and outputting a color selection signal according to the output color setting signal; the electronic display apparatus storing a plurality of color display information, selecting, according to the color selection signal, color display information corresponding to the color selection signal from the plurality of color display information, and setting the color display information as current handwriting color when the electronic handwriting apparatus performs handwriting input on the electronic display apparatus; and
    a pressure sensing unit electrically connected to the at least one color setting button and the first control unit, and outputting the output color setting signal to the first control unit by pressing one of the at least one color setting button.

2. The electronic handwriting apparatus according to claim 1, further comprising a first communication unit electrically connected to the first control unit and the electronic display apparatus, and transmitting signals between the first control unit and the electronic display apparatus.

3. The electronic handwriting apparatus according to claim 2, further comprising a first storage unit electrically connected to the first control unit, and storing the plurality of color selection signals, and the first control unit selecting, according to the color setting signal, the color selection signal corresponding to the color setting signal from the plurality of color selection signals, and outputting the color selection signal to the electronic display apparatus via the first communication unit.

4. The electronic handwriting apparatus according to claim 3, wherein the electronic display apparatus comprises:
    a second storage unit storing the plurality of color display information;
    a second control unit electrically connected to the second storage unit, selecting and outputting, according to the color selection signal, the color display information corresponding to the color selection signal from the plurality of color display information;
    a display unit electrically connected to the second control unit, receiving and displaying the color display information; and
    a second communication unit electrically connected to the second control unit and the first communication unit, and transmitting signals between the second control unit and the first communication unit.

5. An electronic handwriting display system, comprising:
    an electronic handwriting apparatus, comprising:
    at least one color setting button, each outputting a color setting signal, wherein the at least one color setting button is composed of a red color setting button, a black color setting button and a green color setting button;

a first control unit electrically connected to each of the color setting buttons, receiving an output color setting signal and outputting a color selection signal according to the output color setting signal;

an electronic display apparatus electrically connected to the first control unit, storing a plurality of color display information, selecting, according to the color selection signal, color display information corresponding to the color selection signal from the plurality of color display information, and setting the color display information as current handwriting color when the electronic handwriting apparatus performs handwriting input on the electronic display apparatus; and a pressure sensing unit electrically connected to the at least one color setting button and the first control unit, and outputting the output color setting signal to the first control unit by pressing one of the at least one color setting button.

6. The electronic handwriting display system according to claim 5, wherein the electronic handwriting apparatus further comprises a first communication unit electrically connected to the first control unit and the electronic display apparatus, and transmitting signals between the first control unit and the electronic display apparatus.

7. The electronic handwriting display system according to claim 6, wherein the electronic handwriting apparatus further comprises a first storage unit electrically connected to the first control unit, and storing the plurality of color selection signals, and the first control unit, according to the color setting signal, selecting the color selection signal corresponding to the color setting signal from the plurality of color selection signals, and outputting the color selection signal to the electronic display apparatus through the first communication unit.

8. The electronic handwriting display system according to claim 7, wherein the electronic display apparatus comprises:

a second storage unit storing the plurality of color display information;

a second control unit electrically connected to the second storage unit, selecting and outputting, according to the color selection signal, the color display information corresponding to the color selection signal from the plurality of color display information;

a display unit electrically connected to the second control unit, receiving and displaying the color display information; and a second communication unit electrically connected to the second control unit and the first communication unit, and transmitting signals between the second control unit and the first communication unit.

* * * * *